United States Patent Office 3,383,427
Patented May 14, 1968

3,383,427
PROCEDURE FOR SYNTHESIS OF PROPARGYL ALCOHOL
Donald H. Wolfe, Lake Jackson, Tex., assignor to The Dow Chemical Company, Midland, Mich., a corporation of Delaware
No Drawing. Continuation-in-part of application Ser. No. 244,927, Dec. 17, 1962. This application Oct. 21, 1966, Ser. No. 588,314
2 Claims. (Cl. 260—642)

ABSTRACT OF THE DISCLOSURE

The present invtntion concerns a method for the production of acetylenic alcohols from their chlorinated ethylenic intermediates by reacting at from 20° to about 130° C. a liquid nitrogenous compound, for example, ammonia or lower amono, di and tri $C_{1-4}$ alkyl amines, an alkali metal hydroxide and the ethylenically unsaturated chlorinated alcohol having from 3 to 5 carbon atoms, the nitrogenous compound being present in an amount sufficient to dissolve the reactants and the reaction products.

---

The present invention is a continuation-in-part of my earlier filed application Serial No. 244,927 filed Dec. 17, 1962, now abandoned. The present invention relates to a method for the production of unsaturated alcohols and more particularly concerns a novel method for producing the acetylenically unsaturated aliphatic alcohols from their chlorinated ethylenic intermediates.

The known process for producing propargyl alcohol by treatment of 3-chloroallyl alcohol with aqueous caustic is reported in J.A.C.S., 66, 285 (1944) by Hatch and Moore. The best yields and conversions there reported were 81% conversion and 69.3% yield.

It is an object of the present invention to provide a process for the production of acetylenically unsaturated alcohols from their chlorinated ethylenically unsaturated intermediates in greater yields and in better conversions than heretofore thought possible.

In accordance with the present invention, from 0.5 to about 2 moles of a chlorinated ethylenically unsaturated aliphatic alcohol is heated under pressure with about 1 mole of an alkali metal hydroxide in the presence of an amount sufficient to dissolve the reactants of a liquid amine compound at a temperature from about 20–150 degrees C. for from about 20 minutes to 20 hours.

The class of alcohols which can be employed are those having the general formula $C_nH_{2n-2}$—(Cl)—OH wherein $n$ represents an integer from 3 to 5 inclusive and the chlorine atom is on an unsaturated carbon atom and the other unsaturated carbon atom adjacent thereto has a hydrogen atom attached. Thus, one can employ cis or trans 3-chloroallyl alcohol, 3-chloromethylallyl alcohol, 3-chloroethylallyl alcohol as well as 4-chloro-3-butenol, 4-chloro-4-pentenol, 5-chloro-4-pentenol and the like.

The ratio of reactants, as previously set forth can be from 0.5 mole of caustic per mole of alcohol to about 2 moles of caustic per mole of alcohol. Ratios of caustic in excess of 2 moles of caustic per mole of alcohol is not desirable because the desired product, the acetylenic alcohol, is increasingly more unstable as the caustic concentration exceeds 1 mole excess over that theoretically required. Preferably, the caustic to alcohol ratio is maintained between 0.9 mole of caustic per mole of alcohol to about 1.1 moles of caustic per mole of alcohol.

The amine compounds which can be employed are those having the general formula $(R)(R)N(R)$ wherein each R represents hydrogen or an independently selected lower alkyl radical i.e., having from 1 to 4 carbon atoms. Some of such amines are ammonia, methylamine, ethylamint, propylamine, butylamine, di-methylamine, methylethylamine, trimethylamine, tributylamine and the like.

The amount of amine or ammonia which is employed is not critical. However, sufficient amine or ammonia should be employed to dissolve the reactants and reaction products during the reaction. Thus, preferably from about 5 to about 20 moles of ammonia per mole of alcohol is sufficient. The employment of larger amounts is not detrimental to the improved yields but is uneconomical.

The class of basic material which can be employed are the alkali metal hydroxides. Thus, one can employ sodium, potassium, strontium or lithium hydroxide, or the like.

The temperature of reaction is suitably from 20 degrees to about 130 degrees C. and preferably from about 50 degrees to about 100 degrees C.

The reaction is run under such a pressure that the amine or ammonia at the temperature of the reaction is in the lquid state. Higher pressures can be maintained but are usually not necessary and economically of no value.

The following examples illustrate the present invention but are not to be construed as limiting.

Example I.—Propargyl alcohol

A 550 ml. stainless steel autoclave bomb was charged with 46.3 grams (0.5 mole) of 3-chloroallyl alcohol (97.8% cis isomer, 2.2% trans isomer) and 38.5 (ca 0.5 mole) grams of 50% aqueous NaOH and sealed; then 169 grams (ca 10 moles) of liquid ammonia were introduced. The bomb and contents were heated with rocking to a temperature of 75 degrees C. The heating took about one hour. The pressure of the bomb was released and the gases vented to scrubbers. The bomb was opened, washed with the scrubber material and the propargyl alcohol separated. As a result of these operations there was obtained 25.8 grams of propargyl alcohol representing a 96% conversion and a 95.5% yield based on the chloroallyl alcohol consumed. 1.86 grams of unreacted starting alcohol was recovered for recycle.

Example II.—Propargyl alcohol

A 550 ml, stainless steel autoclave bomb was charged with 46.3 grams of 2-chloroalyl alcohol and 38.5 grams of 50% aqueous NaOH and sealed; then 170 grams of liquid ammonia were introduced. The bomb and contents were heated with rocking to a temperature of 80 degrees C. The heating took about two hours. The pressure on the bomb was released and the gases vented to water scrubbers. The bomb was opened, washed with scrubber material and the propargyl alcohol separated. As a result of these operations, 7.3 grams of 2-chloroallyl alcohol and 21.4 grams of propargyl alcohol were recovered. This represents a yield of 90.8 weight percent based on the chloroallyl alcohol consumed and a conversion of 84.2 weight percent.

I claim:
1. A method comprising reacting at from about 20 degrees C. to about 130 degrees C. liquid ammonia, an aqueous alkali metal hydroxide and an ethylenically unsaturated chlorinated alcohol $C_nH_{2n-2}(Cl)OH$ wherein $n$ represents an integer from 3 to 5, inclusive, having the chlorine atom on one unsaturated carbon atom and a hydrogen atom on the other unsaturated carbon and separating the corresponding acetylenic alcohol, said ammonia being present in an amount sufficient to dissolve the reactants and reaction products, said hydroxide being present in an amount of from about 0.5 to 2 moles per mole of alcohol.

2. The process of claim 1 wherein said chlorinated alcohol is 3-chloroallyl alcohol.

References Cited

Hatch et al., J. Am. Chem. Soc. vol. 66 (1944) pp. 285–287 QD1A5.

Ashworth et al., Org. Synth. vol. 35 (1955) pp. 20–22 QD262Q7.

BERNARD HELFIN, *Acting Primary Examiner.*

LEON ZITVER, *Examiner.*

J. E. EVANS, *Assistant Examiner.*